(12) United States Patent
Woodyard (10) Patent No.: US 7,163,312 B2
(45) Date of Patent: Jan. 16, 2007

(54) SPOTLIGHT SYSTEM AND METHOD

(76) Inventor: Joe E. Woodyard, P.O. Box 87132, Houston, TX (US) 77281-7132

( * ) Notice: Subject to any disclaimer, the term of this patent is extended or adjusted under 35 U.S.C. 154(b) by 69 days.

(21) Appl. No.: 10/958,502

(22) Filed: Oct. 5, 2004

(65) Prior Publication Data

US 2006/0072306 A1    Apr. 6, 2006

(51) Int. Cl.
*F21L 4/00*    (2006.01)
(52) U.S. Cl. ............. 362/183; 362/20; 362/109
(58) Field of Classification Search ............. 362/183, 362/109, 157, 205, 190, 20; 315/87
See application file for complete search history.

(56) References Cited

U.S. PATENT DOCUMENTS

| | | | |
|---|---|---|---|
| 3,890,498 A | 6/1975 | Toth, Sr. | |
| 4,314,317 A | 2/1982 | Robson | |
| 4,463,283 A * | 7/1984 | Penney et al. ............. | 315/87 |
| 4,734,832 A | 3/1988 | Moriano et al. | |
| 4,926,299 A | 5/1990 | Gilson | |
| 4,999,752 A * | 3/1991 | Rogers et al. ............. | 362/228 |
| 5,010,454 A * | 4/1991 | Hopper ................... | 362/487 |
| D356,875 S | 3/1995 | Zelina, Jr. | |
| 5,908,233 A | 6/1999 | Heskett et al. | |
| 6,183,105 B1 | 2/2001 | Parker | |
| 6,296,370 B1 | 10/2001 | Bamber et al. | |
| 6,350,040 B1 | 2/2002 | Parker | |

* cited by examiner

*Primary Examiner*—Ali Alavi
(74) *Attorney, Agent, or Firm*—Kenneth L. Nash (57) ABSTRACT

A spotlight system is adaptable for use with preferably one or more power sources so as to provide lighting where needed. The spotlight system preferably includes a spotlight assembly comprising a lamp housing which includes at least one bulb, a switch, and an enclosure. The spotlight system may be operated utilizing DC power with or without a rechargeable battery. The rechargeable battery may be recharged utilizing DC power or AC power while still connected to the lamp housing. When the lamp housing is operated without a battery, then the lamp housing is extremely light for hand held operation with a preferably high power beam.

20 Claims, 3 Drawing Sheets

SPOTLIGHT SYSTEM AND METHOD

FIELD OF THE INVENTION

The present invention relates generally to flashlights and spotlights and, more particularly, to a portable rechargeable spotlight system.

BACKGROUND OF THE INVENTION

Flashlight and spotlight devices are well known in the prior art. Such devices sometimes include rechargeable batteries and are typically portable. To recharge depleted batteries after use, the batteries usually must be removed from the device and carried to a distantly located charging base. The batteries are then inserted into and recharged in the charging base which is typically connected to a conventional house or building electrical outlet that provides necessary recharging current.

Portable flashlight or spotlight devices are commonly used for various nighttime household activities or for a variety of outdoor recreational purposes such as, for instance, setting up a tent or working around a campsite at night (or in low light conditions). A well constructed spotlight is essential for various fishing and hunting activities or, for example, hiking at night or spelunking.

In addition, law enforcement, fire fighting, and medical personnel—frequently engaged in highly critical tasks "in the field" away from convenient building electrical power supplies—may find it difficult to ensure ready access to a durable, high-powered spotlight which is adapted to foster reliable and continuous usage. That is, many spotlight devices are powered by rechargeable batteries capable of supplying power for only a limited time; typically such batteries are only rechargeable using, for example, a charger base adapted to be powered via a home or building outlet. If a person is working on a particularly time-consuming activity which consequently drains the batteries, the device would be rendered useless—possibly at a time when illumination is most critical. Such devices often lack suitable alternative powering means more flexibility adapted for home/office as well as "field" use. As another example, in many cases a bulb can go out which renders the flashlight unusable because of the difficulty in replacing the particular type of bulb utilized in a particular make of flashlight, especially the high powered flashlights which are somewhat more rare.

Moreover, in the aforementioned situations, a person typically must use at least one hand—and sometimes both hands—to support a spotlight or flashlight device and steadily direct the light beam to illuminate a desired working area; this also requires more time to complete the activity and depletes the batteries faster-requiring that the device be recharged more often. For instance, while engaged in the time-consuming task of changing a car tire, it would be awkward and frustrating for a person (at roadside) to use one hand to hold a spotlight—so as to shine it in a trunk to locate tire changing tools—and have only the other hand available to unfasten and/or lift out a cumbersome tire jack or lug wrench or a heavy tire. It also would be very frustrating to attempt to both illuminate the working area under the car—with a hand held flashlight—to properly position and operate the car jack under an axle and also manipulate the heavy tools used to change the tire. Of course, the person may attempt to recruit a second person such as begrudging child or other occupant to hold the spotlight, however, this unnecessarily creates a more risky and unsafe situation for the second person who is needed merely to direct the spotlight—possibly for a long period of time (and in chilly weather)—to steadily illuminate the work area as cars and trucking rigs speed by.

The following U.S. patents disclose a variety of flashlights, spotlights, and other illuminating devices which attempt to address some of the above problems:

U.S. Pat. No. 6,350,040 B1 to Parker, entitled "Flashlight Charger and Rechargeable Battery," discloses a recharger device for a battery which includes a device with a first slot for a first device, such as a flashlight for recharging. A second slot in relationship to the first slot is provided for receiving a second device for recharging. Locking means with each slot such is moveable to permit release one or other device after moving the locking member between a closed position to an open position. The flashlight includes a battery pack to act as a closure of an opening to a battery housing. The closure is in the tailpiece and is mounted in the battery housing. The closure is connected integral with a rechargeable battery such that when the batteries are located in position in the battery housing the battery housing is closed.

U.S. Pat. No. 5,908,233 to Heskett et al., entitled "Auto Rechargeable Flashlight," sets forth an auto rechargeable flashlight provided with a base having a weight coupled to a bottom face thereof. At least one recess is formed in a top face of the base with such recess having a pair of contacts situated on an inner side wall thereof. Further provided is a power cord having a first end coupled to the periphery of the base and a second end having a vehicle cigarette lighter adapter designed to be releasably plugged within a vehicle cigarette lighter socket for receiving power therefrom. The first end of the cord is connected to the contacts for supplying power to appliances to be recharged.

U.S. Pat. No. 6,296,370 B1 to Bamber et al., entitled "Multi-function Modular Storage Light Unit," discloses a multi-function modular storage light unit comprising a primary housing unit and detachable modules such as a radio and an auxiliary flashlight. The primary housing unit contains a spotlight, a power switch, and a handle to carry the unit. There is also a storage compartment built into the primary housing unit. The modules preferably include belt clips for hands-free transport. The modules are removably attached to the primary unit by way of an attachment mechanism which may include alignment features and a latching mechanism. The modules may alternatively be removably attached by their belt clips to sleeves arranged on the primary housing. Each of the detachable modules and the spotlight is independently powered.

U.S. Pat. No. 4,734,832 to Moriano et al., entitled "Spotlight with Interchangeable Handle," sets forth a hand held spotlight which includes a sealed beam enclosure together with one or more detachable handles. The detachable handles each include a latching mechanism capable of translating a magnet between a first position and a second position. A magnetically-actuated switch within the enclosure is used to turn off and on the light circuit. The handle is detachably mounted on the enclosure in a particular position so that the magnetically-actuated switch within the enclosure may be opened and closed by the magnet in the handle. In the preferred embodiments, a single enclosure may be utilized with either a pistol-style grip or a lantern-style grip. The ability to form the beam enclosure without penetrations is particularly useful in providing watertight and explosion-proof spotlights.

U.S. Pat. No. Des. 356,875 to Zelina, Jr., entitled "Combined Spotlight and Recharger Therefor," shows an ornamental design for a combined spotlight and recharger base.

U.S. Pat. No. Des. 427,697 Brazell, et al., entitled "Flashlight," shows an ornamental design for a flashlight.

U.S. Pat. No. 6,318,874 B1 to Matsunaga, entitled, "Power Tools Having Lighting Devices," is directed to power tools that are taught having a motor M1, a tool coupled to the motor M1 via a tool holder, at least one light disposed proximal to the tool, a switch coupled to the motor M1 and the light, the switch being capable of activation by an operator, a power supply coupled to the switch, and a timer circuit coupled to the light, the switch and the power supply. Preferably, activation of the switch causes the motor M1 and the light to operate and the timer circuit causes the light to remain lit for a predetermined amount of time after either (1) the switch has been activated or (2) the switch has been deactivated subsequent to being activated. The timer circuit can be, for example, a RC timer circuit or a microprocessor. The light may be an LED. The power supply can be a rechargeable battery.

U.S. Pat. No. 4,926,299 to Gilson, entitled, "Portable Flashlight," is directed to a battery powered flashlight which includes a case holding a battery, lamp, reflector and an electric circuit comprising switch means for connecting and disconnecting the battery to selectively energize and turn off the lamp. The flashlight includes a lens supported adjacent an end or side of the case in front of the lamp and reflector forming a rectangular beam of light when the lamp is energized for providing a non-glare illumination of a relatively small rectangular area such as along a sidewalk or a stair tread. The flashlight may also include a second lamp and reflector at an opposite end of the case providing a spotlight and a switch for selecting between the spotlight and the area illuminating beam. The flashlight may include a carrying handle in the form of a bail which acts to operate the switch for initiating the rectangular beam of light or alternatively the spotlight. When the handle is in an open or carrying condition for supporting the flashlight, the case depends downwardly therefrom and when the handle is in a closed position portions of the handle provide protective covers for each of the lens and lamp combinations while the flashlight is not in use.

U.S. Pat. No. 4,314,317 to Robson, entitled, "Flashlight," sets forth a flashlight having side by side compartments for storage and a battery respectively. The battery compartment has partial dividers for confining the battery and leaving a space for a contact strip having a leg portion on which the battery sits. A snap in divider fits above the battery to hold a lamp, and the top of the contact strip is bent inwardly to make contact with the base of the lamp. Different color light transmitting caps can be put over the lamp so that the flashlight can be used for spectator voting or approval. Preferably different color caps can be kept in the storage compartment.

U.S. Pat. No. 3,890,498 to Toth, Sr., entitled, "Flashlight Device," sets forth a flashlight device of the type for use with one or more battery cells including a main body member having a switch actuatable light assembly.

U.S. Pat. No. 6,183,105 B1 to Parker, entitled, "Flashlight and Charger," is directed to a flashlight which includes a rechargeable battery and is loaded from the base of the body of the flashlight. The contacts are on the barrel of the flashlight and are for contact with the recharging device. On top of the battery there is a tangentially directed spring member for contacting a ring of the top contact of the battery and a permanently located stud member in the central location. An enlarged head is located between the intermediate portion which is located between the head and the barrel. The intermediate portion receives the switching device.

In addition, an example of a publication related to flashlights or rechargeable devices is shown at http://cgi.ebay.com/ws/eBayISAPI.dll?ViewItem&item=2372703204&category=50381 under the description of "Ryobi Cordless Drill and Flashlight Combo."

However, in view of the foregoing, there consequently remains a need for a ruggedly built, portable spotlight device which is not only battery powered but also both rechargeable and functional when connected to a home or building electrical outlet—as well as when connected to a conventional vehicle cigarette lighter—like electrical socket. Moreover, there remains a need for a stable, self-supporting and adjustable spotlight configured for effective functional use in a "hands-free" mode with the light beam being selectively directable to permit desired illumination of a work area or the like.

Those of skill in the art will appreciate the present invention which addresses the above needs and other significant needs the solution to which are discussed hereinafter.

SUMMARY OF THE INVENTION

It is an objective of the present invention to provide an improved flashlight.

It is another objective of the present invention to provide a more reliable flashlight.

It is yet another objective of the present invention to provide a ruggedly built, portable spotlight device which operates from multiple power sources.

Another objective of the present invention is to provide a stable, large diameter beam, flashlight comprised of readily replaceable critical components.

It is yet another objective to provide a flashlight which may be self-supporting and may be adjustable spotlight configured for effective functional use in a "hands-free" mode with the light beam being selectively directable to permit desired illumination of a work area or the like.

These and other objectives, features, and advantages of the present invention will become apparent from the drawings, the descriptions given herein, and the appended claims. However, it will be understood that above-listed objectives of the invention are intended only as an aid in understanding aspects of the invention, are not intended to limit the invention in any way, and therefore do not form a comprehensive or restrictive list of objectives, and/or features, and/or advantages.

Accordingly, a spotlight system is provided which is preferably adaptable for use with multiple power sources so as to provide lighting where needed. For example, the spotlight system is preferably adapted for use with automobile DC power with or without use of a battery. The flashlight may also operate with AC and batteries may be charged using either AC or DC power. The spotlight system may comprise one or more elements such as, for instance a lamp-housing, with the lamp housing comprising at least one bulb, a switch, and an enclosure. The enclosure is preferably configured for releaseably mounting at least one bulb therein and has at least a front comprising a lens configured for a desired dissemination of a light beam from the bulb passing therethrough. Additional elements may comprise a non-rechargeable, off-the-shelf battery supply or, for example, a rechargeable battery in a battery casing and a recharger connectable to AC power. The battery casing is preferably configured so as to be insertable into the lamp housing, with the rechargeable battery being removeable from the lamp housing (or from the battery casing having the rechargeable battery releaseably contained therein) and insertable into the battery charger for charging with AC power. Electrical contacts are preferably configured to be matable with the lamp housing to provide an electrical connection to the bulb through the switch from the battery.

The system may further comprise a power cord removeably connectable between an automobile DC power and the lamp housing such that when the cord is connected to automobile DC power then the automobile DC power is electrically available for connection to the bulb through a switch such that the bulb is operable without the rechargeable battery. The power cord is preferably removeably connectable to a vehicle cigarette lighter electrical socket for DC power. In this way, the lamp housing without the rechargeable battery weighs less for hand held usage. When the rechargeable battery is inserted in the lamp housing (or alternately, when the battery casing preferably containing the rechargeable battery therein is inserted in the lamp housing) then the rechargeable battery is connected to automobile DC voltage for charging. With this configuration, the bulb is operable with either the rechargeable battery or automobile DC power. The lamp housing further preferably comprises a compartment therein for the power cord.

The battery casing preferably comprises a second side defining a support surface with a size and shape adapted for supporting the spotlight lamp housing with the rechargeable battery having a weight with a center of gravity substantially adjacent the support surface. With this configuration, when the rechargeable battery (preferably contained within the battery casing) is inserted in the lamp housing, then the weight of the rechargeable battery and the support surface of the battery casing form, in effect, a ballast-like structure which provides an anchoring effect to help prevent toppling of the lamp housing when in a desired position. In one embodiment, the lamp housing is preferably movable with respect to the battery casing such that the battery casing may be suitably positioned and the light beam may be selectively directed to illuminate a given area. Moreover, at least a portion of the lamp housing is preferably formed from a metallic material to foster a durable construction.

The spotlight system, in a preferred embodiment, further comprises a plurality of rechargeable batteries with the recharger defining a plurality of slots for simultaneously receiving the plurality of rechargeable batteries.

The spotlight system also preferably comprises a rectifier and voltage regulator in the lamp housing, whereby the rechargeable battery may be charged by selectively connecting the lamp housing to AC power or automobile DC voltage for charging.

In one embodiment, the lamp housing further preferably comprises an elongated handle having a base end connectable to the battery casing. The elongated handle may be foldable such that the battery casing connectable thereto may be positioned adjacent the lamp housing. A trigger switch may be mounted to the handle with the switch operable intermittently in a spring-loaded position or with a latch to keep the light on without the need to hold the trigger in. In addition, the lamp housing may further comprise a relative bulb positioning adjustment member for selectively changing the position of the bulb with respect to the enclosure so as to adjust the light emanating from the bulb and passing through the lens. This may include a reflective member configured to be moveable with respect to the bulb.

In an embodiment, the bulb may be a driving light bulb suitable for being removeably mounted in a given vehicle driving headlight so as to foster interchangeability in the event either the driving light bulb in the lamp housing or the vehicle driving headlight bulb burns out.

The present invention also provides a method for making a spotlight system. The method may comprise one or more steps such as, for instance, providing a lamp housing having at least one bulb releaseably mounted therein. Additional steps may comprise providing at least one rechargeable battery insertable in a modular battery casing. Other steps may comprise forming electrical contacts on the modular battery casing and then providing that the lamp housing is detachably mounted to the modular battery casing. Further steps may comprise providing an electrical switch for electrical connection to the bulb through the switch from at least one rechargeable battery. Other steps may comprise providing a power cord releaseably connectable between automotive DC power and the lamp housing whereby the automotive DC power is electrically available for connection to the bulb through the switch. Another step may be to provide that the bulb is selectively operable with either a rechargeable battery or automotive DC power. The method may also have the step of providing that at least one rechargeable battery is rechargeable in a recharger connectable to AC power with the charger defining at least one slot for receiving at least one rechargeable battery.

Moreover, the method may also comprise the step of providing a rectifier and voltage regulator in the lamp housing so that least one rechargeable battery may be selectively charged using AC power or automobile DC voltage. Another step may comprise providing a selected circuit configuration and an AC power adapter, with the AC power adapter being releaseably connectable to AC power such that the spotlight system bulb is operable using AC power, at least one rechargeable battery or another type of battery supply.

In addition, another step may comprise providing a driving light bulb which is removeably mountable in the lamp housing and also interchangeable with a given vehicle driving headlight bulb. In this way, a person may select a driving light bulb which is doubly suited for being useable with the spotlight system—as well as in a given vehicle driving headlight.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

Figure 1:
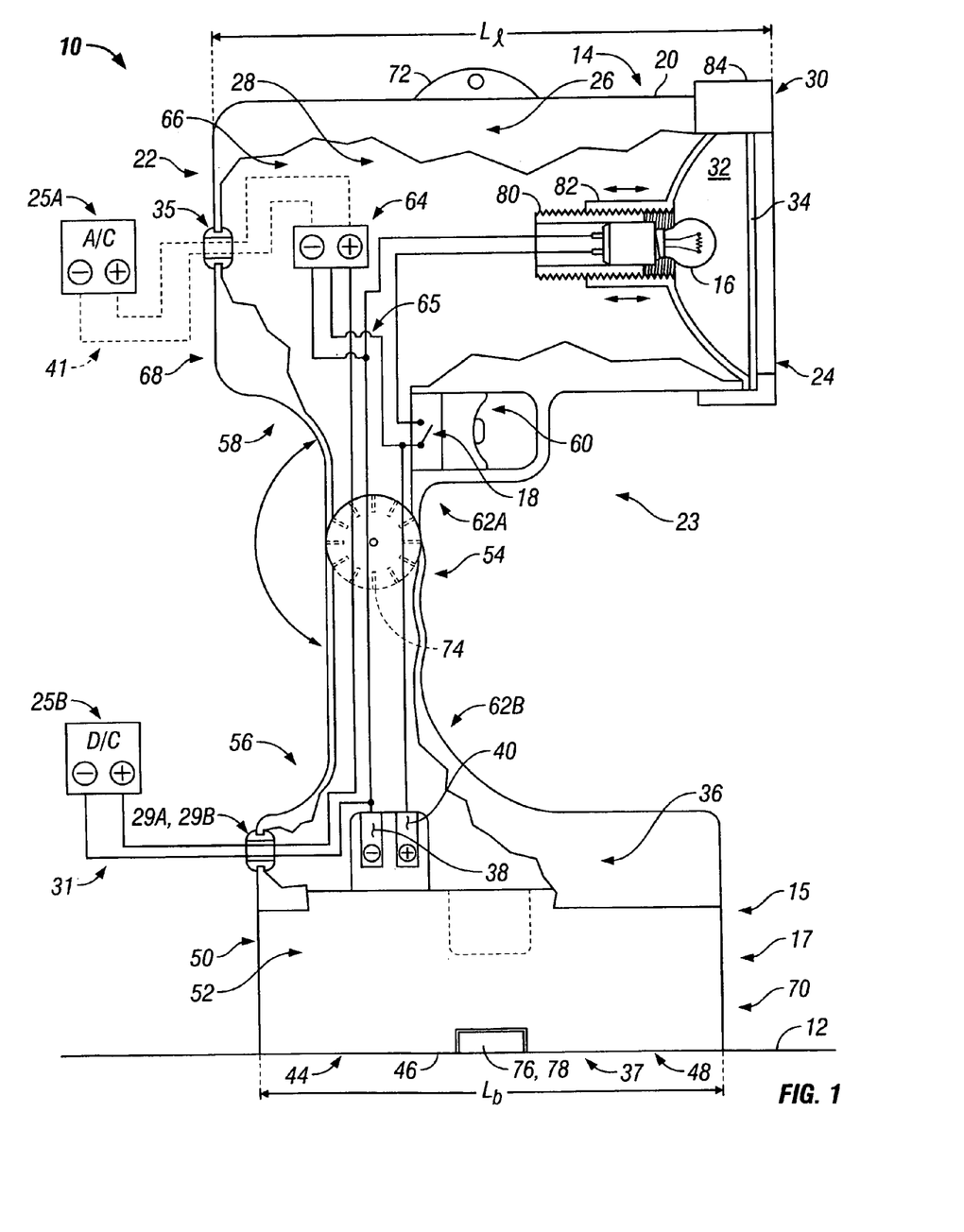
FIG. 1 is schematic of one possible embodiment the invention showing a partial cutaway view of part of a spotlight system including a lamp housing with an elongated handle and a battery casing with a battery supply releaseably contained therein.
Figure 2:
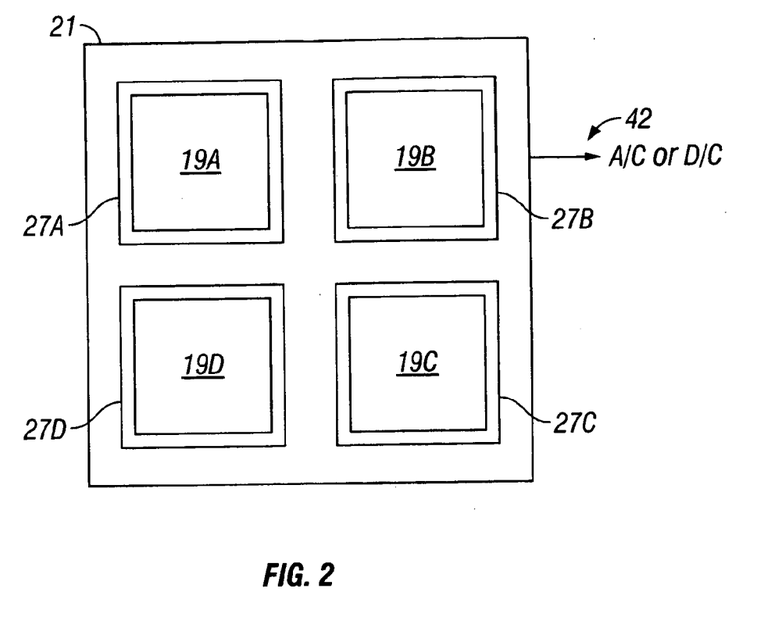
FIG. 2 is a block diagram of one possible embodiment of the invention depicting a top view of a multiple battery recharger connectable to AC power.

Referring initially to FIG. 1 and FIG. 2, there is shown a spotlight system 10 adapted for use in a variety of situations so as to provide more flexible—and reliably continuous—lighting where needed.

In one presently preferred embodiment, spotlight system 10 is adapted for convenient "hand-held" use, for example, for various household activities or outdoor recreational activities such as hunting, fishing, camping, etc. However, spotlight system 10 is also specially adapted for effective "hands-free" use, for example, by a camper to set up a tent at dusk—or by a police officer during a nighttime traffic stop. That is, various structures of spotlight system 10 are specially configured to be placed on the ground or some other surface 12 or on some object (or even suspended from an object) and/or selectively positioned and oriented so as to illuminate a certain area as desired—leaving a person's hands free to engage in other activity. When operating it a lightweight mode, spotlight system 10 may be connected to the DC power of a vehicle and operate without the battery thereby making the flashlight extremely powerful but very lightweight.

An advantage of spotlight system 10 is that it is adaptable for use with multiple power sources (e.g., battery power, vehicle DC power, and/or AC power sources as will be explained hereinafter in further detail). Such a configuration helps foster more reliable, "continuous lighting availability," when, for example, out "in the field" away from the convenience of home or office AC power.

As shown in FIG. 1 and FIG. 2, spotlight system 10 preferably includes a lamp housing 14, a battery casing 15, and a battery supply 17. In one preferred embodiment battery casing 15 and battery supply 17 are of one-piece construction and may comprise a common rechargeable battery 19, although this is not required. Battery casing 15 is preferably configured to detach from lamp housing 14 when desired. This in effect forms a modular battery casing 15 and/or lamp housing 14. Battery supply 17 may comprise several batteries such as battery 19A, 19B, etc. discussed hereinafter. In a preferred embodiment, a commonly available type of chargeable battery 19 may be utilized. In another embodiment, several rechargeable batteries may be utilized or mounted within battery casing 15 to provide additional power. If multiple rechargeable batteries are used, then the batteries may, if desired, be switched to operate to either sequentially or simultaneously.

The battery casing 15, which as noted above may comprise a standard rechargeable battery 19, is configured so as to preferably be insertable into the lamp housing 14 whereby contacts 38 and 40 are connected to bulb 16, preferably through switch 60.

Rechargeable battery 19 may recharged while still in place in lamp 14, utilizing either AC or DC power. However, battery 19 may also be removeable for recharging in battery charger 21. In one preferred embodiment, battery charger 21 may also operate utilizing either AC or DC power 42.

Another option is to keep multiple batteries charged so that the light may be operated continuously for hours. For instance, battery charger 21 may charge several batteries at once. In FIG. 2, four batteries 19A, 19B, 19C, and 19D are shown but more could also be utilized. Accordingly, a freshly charged second rechargeable battery 19B could be used to replace the first rechargeable battery 19A when it is depleted, and so forth. With multiple battery charger operating from a car battery, the light may be used all night, desired.

In another embodiment, one or more rechargeable batteries 19 may be removed as desired for charging and subsequently replaced into the casing 15 which in turn may be inserted in lamp housing 15. For instance, casing 15 may be adapted to receive different types of rechargeable batteries thereby making replacement of rechargeable batteries more reliable and possibly less expensive if prices for the batteries change. As another example, different casings 15 may be utilized which are useable with different types of rechargeable batteries. However, in a presently preferred embodiment, casing 15 and battery 17 may simply be a standard rechargeable battery already available on the market. As noted above battery supply (e.g., 17 or 19 or multiple batteries 19A, 19B, etc.) could be integrally formed with casing 15 so as to be removable as a more modular unit.

Electrical contacts are preferably configured to be matable with the lamp housing 14 to provide an electrical connection to the bulb 16 through a switch 18 from the battery (17 or 19). In a preferred embodiment, battery casing 15 is preferably constructed with a first side 36 having electrical contacts 38, 40 formed thereon. However, contacts could be formed on the battery (17 or 19) itself, if, for example, integrally constructed with casing 15, so as to be modularly insertable into lamp housing 14. The lamp housing 14 is preferably configured to provide a matable connection with battery casing 15 (or the battery 17, 19) to thereby establish an electrical connection between the lamp housing and battery casing, and at the same time establish a sturdy mechanical connection.

Figure 4:
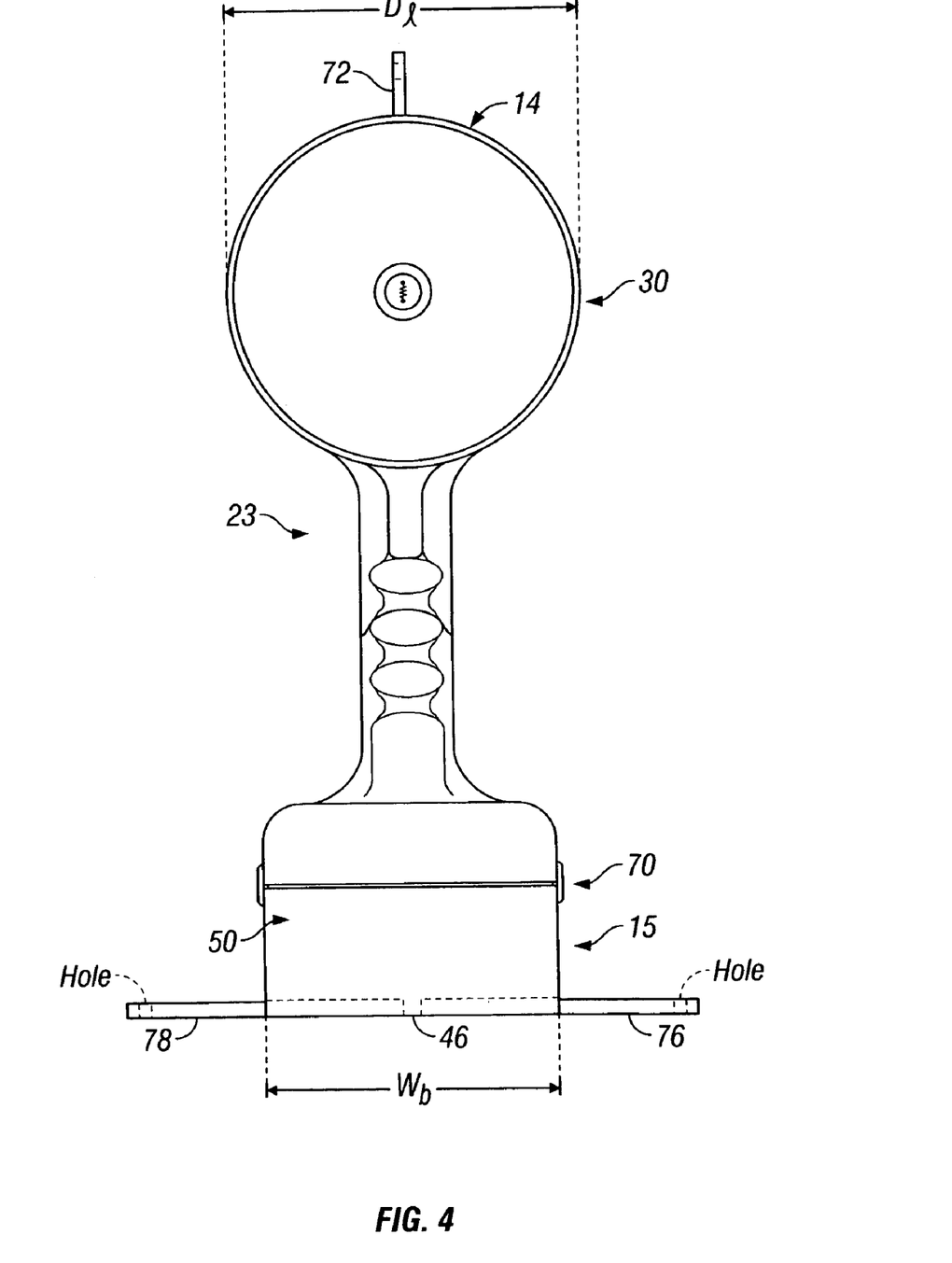
FIG. 4 is a front elevational view of one possible embodiment of the invention showing the lamp housing mounted to the battery casing.

Referring to FIG. 1 and FIG. 4, a presently preferred embodiment of the lamp housing 14 of spotlight system 10 includes at least one bulb 16, a switch 18, and an enclosure 20. Battery casing 15 is ideally configured so as to be insertable into lamp housing 14 in such as a way as to provide an electrical connection to bulb 16 through electrical switch 18 from the battery supply 17. That is, electrical switch 18 permits an electrical connection to bulb 16 from battery supply 17 through the electrical contacts 38, 40—when lamp housing 14 is detachably mounted to battery casing 15. In this way, electrical switch 18 is configured for selectively connecting power from battery supply 17 (e.g., rechargeable battery 19) to bulb 16 so as to illuminate bulb 16 in a connected illuminating mode. Conversely, electrical switch 18 is also configured for selectively disconnecting battery supply 17 from bulb 16 so as to extinguish bulb 16 in a disconnected mode.

As shown in FIG. 1 and FIG. 4, it should be recognized that various structures of spotlight system 10 are preferably combined as a spotlight assembly 23 and may be configured for convenient "hand-held" use. In one preferred embodiment, spotlight assembly 23 includes at least a lamp housing 14, battery casing 15, and rechargeable battery supply 19 releaseably contained within battery casing 15; the lamp housing 14 also preferably includes an elongated handle 54.

Another major advantage of the spotlight system 10 configuration, as briefly mentioned before and explained in more detail hereinafter, is that it is adaptable for use with multiple power sources.

Spotlight system 10 is preferably adapted to be powered by a conventional rechargeable battery 19. Also, as previously mentioned, a preferred embodiment of spotlight system 10 is adapted to include at least one rechargeable battery supply 19; the complementary battery charger 21 connectable to AC or DC power 42 is constructed so as to define at least one slot for receiving at least one rechargeable battery 19. Preferably battery charger 21 comprises a plurality of slots for several identical rechargeable batteries 19A, 19 B, 19C, and so forth, (not necessarily sized and configured as shown in FIG. 1 and FIG. 2).

Accordingly, the rechargeable battery 19 can be configured to be directly insertable and removeable from the lamp housing 14 and then insertable in the battery charger 21 for charging with AC or DC power 42. With the embodiment wherein battery charger 21 defines a plurality of slots (e.g., 27A, 27B, 27C, 27D) for simultaneously receiving the plurality of rechargeable batteries 19A, 19B, 19C, 19D, spotlight system 10 is adapted to help ensure that a fresh supply of recharged batteries (e.g., 19A, 19B, 19C, 19D) is ready—"on demand"—so as to provide sufficient "portable" power and foster more reliably continuous operational availability of spotlight assembly 23.

However, spotlight system 10 is also preferably constructed to also operate on vehicle DC power (e.g., 12 volts) whereby battery 19 may be charged while still connected to lamp housing 14. For instance, spotlight system 10 may preferably be able to use automotive DC power 25B—"in the field"—where AC power (e.g., for charging) generally is not readily available for charging battery 19. Alternatively, automotive DC power 25B may be employed to directly operate the spotlight assembly 23 without battery 19 being in place, thereby making the flashlight very light and easy to hold with one hand, even for extended periods of time.

FIG. 1 illustrates a generalized schematic of a possible embodiment of a vehicle DC power adapter 31 preferably configured to be releaseably connectable with a DC power connection such as one would find in a vehicle (e.g., for use in ground, sea, air, space transportation) or some remotely located electrical supply providing suitable DC power. Vehicle DC power adapter 31 is preferably removeably connectable between DC power and the lamp housing 14 such that when DC power is connected to the lamp housing 14, switch 18 is configured for selectively connecting DC power to bulb 16 without the rechargeable battery 19.

Figure 3:
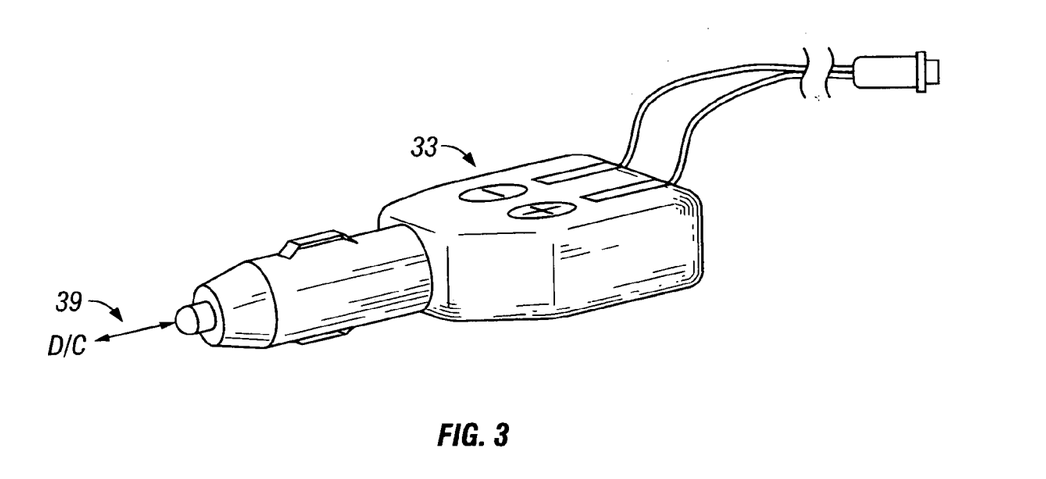
FIG. 3 is schematic of one possible embodiment the invention showing a vehicle DC adapter, or power cord, configured to be removeably connectable between automobile DC power and the lamp housing.

In one preferred embodiment, a direct connection to automotive DC power may be made using a vehicle cigarette lighter electrical socket. Referring to FIG. 3, a general schematic is shown of a preferred embodiment of a vehicle DC power adapter, such as, for example, power cord 33, configured to be releaseably connectable with a vehicle cigarette lighter electrical socket or some other receptacle suitable for connecting to automobile DC power 39. That is, cord 33 is preferably removeably connectable between a vehicle cigarette lighter electrical socket and the lamp housing 14 having a connectable configuration (e.g., with an electrical connector 29B (shown in FIG. 1), circuitry or the like). Thus, when power cord 33 is connected between automobile DC power 39 and the lamp housing 14, then automobile DC power is electrically available for connection to bulb 16 through a switch 18 such that the bulb 16 is operable-with or without the rechargeable battery 19.

It should be recognized that this configuration has another major advantage. That is, the lamp housing 15—without the rechargeable battery 19 and/or casing 15—weighs much less so as to be easily hand-held. Conversely, when the rechargeable battery 19 (preferably contained within casing 15) is inserted in the lamp housing 14 then the rechargeable battery 19 is connected to automobile DC voltage for charging. Thus, bulb 16 is operable with either the rechargeable battery 19 or automobile DC power 25B. The charger 21 may also be configured, if desired, to be operable with DC automotive power.

To accommodate vehicle DC power, the battery casing 15 preferably includes an electrical connector 29B configured for detachable connection to a vehicle DC power adapter such as, for example, power cord 33 which is releaseably connectable to a vehicle cigarette lighter electrical socket.

It will further be appreciated that spotlight system 10 is preferably operable with yet another power source to further enhance a construction that fosters "continuous lighting availability" of the system 10. That is, spotlight system 10 may also preferably includes at least one AC connector (e.g., 35) so that the spotlight assembly 23 may be connected directly to and operated using AC power 25A—via a home or building electrical AC outlet or the like. Thus, circuit 64 may comprise a regulator for regulating the DC voltage and/or a rectifier bridge for converting AC to DC as desired for operating bulb 16.

In other words, an AC power adapter 41 is preferably removeably connectable between AC power 25A and the lamp housing 14 having a connectable configuration (e.g., with electrical connector 35 (see FIG. 1), circuitry or the like). The lamp housing 14 preferably further includes a selected circuit configuration such that when AC power 25A is connected to the lamp housing 14, the switch 18 is configured for selectively connecting AC power 25A to bulb 16 without the rechargeable battery 19.

However, spotlight system 10 may also include another electrical connector which could be mounted, for example, to lamp housing 14 or battery casing 15. For example, an electrical connector 29A could be preferably adapted for detachable connection to an AC power adapter which is releaseably connectable to AC power 25A. In one embodiment, spotlight system 10 may include a single cord that has a DC connector and an AC connector; appropriate circuitry could also be utilized to detect the type of power and apply it accordingly.

In one preferred embodiment, the spotlight system 10 may include a selected circuit configuration such that when the AC power adapter 41 is connected to AC power 25A then AC power 25A is electrically available through the selected circuit configuration for connection to bulb 16. Power is selectively connectable through electrical switch 18. As mentioned before, with such a configuration, bulb 16 is operable without the rechargeable battery 19. In this way, the lamp housing 14—without the rechargeable battery 19 (and/or casing 15) attached—weighs less so as to foster more convenient "hand-held" usage. Conversely, when the lamp housing 14 is mounted to the battery casing 15 (i.e., releaseably containing rechargeable battery 19 therein) then the bulb 16 is operable with either the rechargeable battery 19 or AC power 25A.

Accordingly, as shown in FIG. 1, a preferable embodiment of spotlight system 10 may comprise a rectifier and voltage regulator 64 (mounted, for example, in lamp housing 14). With this circuit configuration, the rechargeable battery 19 may be charged by selectively connecting the lamp housing 14 to either vehicle DC voltage or AC power for charging. In a preferred embodiment, as shown in FIG. 1, a circuit 65 is the regulated voltage that goes to the trigger (e.g., 18 or 60) and to the plus terminal on the battery (e.g., 17, 19).

Moreover, in another embodiment, to further foster convenient use of multiple power sources, a power cord may be configured with a first connector for AC power, a second connector to a car cigarette lighter, and a third connector to the lamp housing 14.

In view of the foregoing, a major benefit of spotlight system 10 is that it is—advantageously and flexibly—adapted for more long-term, consistent and reliable use with a variety of power supplies. That is, system 10 is preferably adapted to employ at least four power sources (e.g., conventional off-the-shelf battery power 17, rechargeable battery power 19, DC power 25B, and AC power 25A) and possibly other power sources. With this construction, spotlight system 10 is more universally and reliably useable at home or in a building (near AC power)—or out "in the field" away from the convenience of AC power.

Turning now to FIG. 1 and FIG. 4, in one preferred embodiment of the lamp housing 14 of spotlight system 10, enclosure 20 preferably includes a back 22, a front 24, and a peripheral structure 26 therebetween defining an interior 28. It should be recognized that enclosure 20 could have any of a variety of shapes and sizes; however, enclosure 20 preferably has a barrel-like, cylindrical shape 30 as shown in FIG. 1. In a preferred embodiment, the housing is sized to provide a large powerful beam.

Enclosure 20 further preferably includes a reflective member 32 adapted to reflect a given light beam from bulb 16 with the reflective member 32 being mountable within the enclosure interior 28. Also, enclosure 20 is ideally configured with at least a portion of front 24 having a lens 34 adapted for a desired dissemination of a light beam from bulb 16 passing therethrough. The preferred diameter of lens 34 is ideally in the range of about 3½ inches to about 5 inches, as shown in FIG. 4 by the designation Dl—however, the diameter may be larger or smaller. Lens 34 is preferably clear but could also be formed from a colored translucent material (e.g., using a replaceably mounted lens configuration).

It should be noted that other portions of enclosure 20, lamp housing 14 or other spotlight system structures could also be formed from translucent materials of clear or various colors or material of solid colors. Various structures of spotlight system 10 could also be formed from plastic materials for lightweight, weather-resistant, and/or insulating characteristics or, for example, from durable, weather-resistant metals. Also, the exterior of the spotlight system 10 and/or assembly 23 could have a camouflaged appearance (e.g., for hunting or the like). However, to aid in forming a rugged and durable construction, a preferred embodiment of spotlight assembly 23 is configured such that at least the enclosure 20 of the lamp housing 14 is formed from a metallic material.

The spotlight system 10 also preferably includes a relative bulb positioning adjustment. This may be configured such that bulb 16 can move with respect to the enclosure 20 (or other structures)—or vice versa. For example, in one embodiment, reflective member 32 may be moveable with respect to bulb 16 so as to adjust the light disseminated through the lens 34. In addition, bulb 16 may be mounted, for example, in a threaded cylinder 80 with reflective member 32 having complementary threads 82 so that by rotating adjustment member 84 (or outer lens 34), preferably being configured to also rotate reflective member 32, the focus of and/or dissemination of light from bulb 16 can be changed.

The relative bulb positioning adjustment may also be configured for selectively changing the position of the bulb 16 with respect to enclosure 20 so as to adjust the light emanating from the bulb and passing through the lens 34. In addition, the lens 34 may have varying configurations (e.g., thicknesses, shapes) or be replaceable with other types of lenses to adjust light passing through it and adjust the illumination of a given area as desired.

In a preferred embodiment, enclosure 20 is also configured for releaseably mounting at least one bulb 16 therein; although, multiple bulbs could also be releaseably mounted within enclosure 20. A standard off-the-shelf bulb such as an automobile headlight bulb is utilized in a preferred embodiment and is configured to be removeably mountable may also be used with the spotlight system 10. Automobile headlight bulbs are readily available at any auto supply place and therefore ensure that a suitable, high quality, bulb may be easily found whenever needed. If desired, the housing may include a spare light bulb in a compartment (not shown).

Accordingly, one preferred embodiment comprises a conventional vehicle driving light bulb (for example, 12 volt, 250,000 CP) releaseably mounted within lamp housing 14. It should be recognized that utilizing such a configuration allows a person to select a driving light bulb which is doubly suited for being removeably mounted in spotlight system 10—as well as in a given vehicle driving headlight. In other words, this configuration fosters "light bulb interchangeability" in the event that either the driving light bulb 16 in the lamp housing 14 or the vehicle driving headlight bulb burns out and needs to be replaced—"on the spot." In this way, spotlight system 10 is designed to help ensure light is continuously available from not only system 10 itself—but also from a given vehicle headlight (which helps minimize the possibility of, for example, the spotlight user having to drive a car at night that looks like a "one-eyed bandit").

In view of the foregoing, it can be seen that spotlight system 10 is particularly constructed to promote reliable and continuous lighting and system availability. This better ensures that the spotlight system 10 is not rendered entirely useless (e.g., because of an unavailable power source or a burned out bulb). This type of spotlight system availability may be especially critical in emergency situations such as, for example, when a person is alone and trying to quickly change a flat tire on a busy or remote stretch of highway at night—or when a police or security officer is on night patrol.

It should also be appreciated that spotlight system 10 preferably has a certain structural size and shape that may be configured to accommodate a built-in storage compartment in, for example, the lamp housing 14. That is, with a preferably large spotlight-sized lens configuration (e.g., a 3½ to 5 inch diameter lens), the correspondingly large barrel-like interior 28 has a useable open cavity region 66, behind reflective member 32, which may be used for storage. Storage compartments could also be constructed into the battery supply 17, charger 21, adapters 31, 33, 41 or other spotlight system structures such as, for example, casing 15 (which, with the additional weight, would further foster self-supporting stability). Moreover, since spotlight system 10 is a lighting device, a user might naturally think of looking for a replacement bulb (for a given vehicle headlight as well as the spotlight system) stored in such a compartment; the user may then replace a bulb which burned out in the lamp housing 14—or in a given vehicle headlight (since they would be interchangeable). In view of the foregoing, the lamp housing 14 preferably further includes a compartment therein for the power cord 33. The back 22 of enclosure 20 could be configured with an access panel or door 68 for releaseably storing a power cord or other objects within a compartment preferably formed within the lamp housing 14 (e.g., within cavity region 66).

Referring again to both FIG. 1 and FIG. 4, the battery casing 15 preferably includes second side 37 which serves as a bottom 46 with at least a portion of the bottom 46 having a generally planar exterior surface 48; casing 15 further includes a top face on first side 36, and a periphery 50 formed therebetween defining an interior 52 adapted for releaseably containing the battery supply 17 (e.g., rechargeable battery 19). The second side 37 preferably defines a support surface 44 with a size and shape adapted for supporting spotlight assembly 23.

Battery 19 ideally has a weight with a center of gravity substantially adjacent support surface 44 when the battery 19 is connected to light housing 14. This configuration helps ensure that the weight of the spotlight assembly 23 is not distributed unnecessarily in a "top-heavy"—more unstable manner even though the beam width, as noted above, is large and powerful. Thus, for example, when the battery 19 is inserted into the lamp housing 14, the combination of the weight of the battery and the selected configuration of outer casing 15 (with support surface 44) in effect forms a ballast-like structure 70. That is, the combined structural configuration of the casing and battery supply weight has an anchoring effect to help prevent toppling of the lamp housing 14 attached to the casing when the spotlight assembly 23 is positioned as desired.

Moreover, to further enhance the stability of the spotlight assembly 23 when placed on a surface 12 or some object, yet another embodiment may comprise one or two legs (and possibly more). For instance, a first leg 76 and second leg 78 may be attached to battery casing 15, as shown in FIG. 1 and FIG. 4. Three legs could also be attached in a tripod-like manner or at various positions on battery casing 15—or even on lamp housing 14 if used without the battery casing attached. Legs 76, 78 could also be configured so as to extendable beyond the periphery of the battery casing 15 as well as retractable therein when not in use. In addition, as shown in FIG. 4, holes could be made, for example, near the distal ends of legs 76, 78 in order to provide a secondary way (in addition to support member 72) to suspend spotlight assembly 23. With such a configuration, spotlight assembly 10 could also be suspended in an inverted mode such that the lamp housing 14 is positioned below battery casing 15 to provide additional flexibility in directing a light beam from bulb 16 to illuminate a desired area.

Referring to FIG. 4, one preferred embodiment of spotlight system 10 includes casing bottom 46 ideally having a width, designated by $W_b$, which is in the range of 70% to 98% of the lens diameter, designated by $D_l$. However, in an alternate embodiment, bottom width $W_b$ could also be in the range of 50% to 110% of the lens $D_l$ (or can be different than this range if needed, for example, for more stability, reflector size, etc.). Preferably $L_b$ is approximately the same length as $L_l$ but may vary depending on the type of battery utilized, e.g., rechargeable battery 19.

Moreover, lamp housing 14 could also have a non-cylindrical configuration with the lens having a width proportioned in the same manner. As shown in FIG. 1, the bottom 46 has a length, designated by $L_b$, that is preferably in the range of about 70% to 110% of the lamp housing length, designated by $L_l$; but length $L_b$ could also be in the range of 50% to 110% of length $L_l$ (or can be different than this range if needed, for example, for more stability).

In addition, it should also be recognized that there are other advantages of having the lamp housing 14 and battery casing 15 detachable such as, for example, ease of storage. Also, separating housing 14 and casing 15 could help prevent the possible leakage of battery acid (from batteries left too long in casing 15) or other contaminants from possibly entering into the lamp housing 14 and damaging circuitry or the like.

In a preferred embodiment particularly adapted to further promote convenient "hand-held" usage, the lamp housing 14 further includes elongated handle 54 having a base end 56 connectable to the battery casing 15. Base end 56 is preferably detachably mountable to battery casing 15. In this way, spotlight assembly 23 may be configured with an elongated handle 54 for ease of handling (However, elongated handle 54 can also be included independently—not as part of lamp housing 14, with such a configuration, elongated handle 54 would comprise a base end 56 connectable to the battery casing 15 and a support end 58 attached to the lamp housing 14). In addition, a conveniently positioned trigger switch 60 is preferably formed into elongated handle 54 to facilitate connecting or disconnecting power to the bulb as desired using, for example, an index finger. The trigger switch 60 is preferably operable intermittently in a spring-loaded position or with a latch to keep the light on without the need to hold the trigger in. Trigger switch 60 may also be configured with a safety-like feature to lock the switch in the off-position so as to prevent it from inadvertently being switched on—and draining the batteries. It should be noted however that the switch (e.g., 18, 60) may also be formed from any of a variety of electrical switches. Moreover, a dimmer switch-like configuration may also be used to provide more selective variable illumination control.

In addition, as shown in FIG. 1, the elongated handle 54 may, if desired, be configured to be foldable. A joint 74 having, for example, a pivotable, hinge-like, or ball-in-socket-like structure may be used such that a first portion 62A of elongated handle 54 is selectively moveable with respect to a second portion 62B of elongated handle 54 (other structures permitting relative movement between the handle portions 62A, 62B may also be used). With this configuration, elongated handle 54 may be folded in such a way that the battery casing 15 connectable thereto is selectively positioned adjacent the lamp housing 14, for example, to facilitate more compact storage of the spotlight assembly 23.

In addition, it should be further recognized that spotlight system 10 may also be configured to facilitate "hands-free" usage. Spotlight assembly 23 is ideally configured for effective illumination even when the spotlight assembly 23 is self-supported (e.g., without a person having to support it). Preferably, the lamp housing 14 is configured to be movable with respect to the battery casing 15 to effectively help achieve selective illumination. In this way, spotlight assembly 23 can be used to more selectively and accurately illuminate an area--without a person having to hold and direct the light beam. In one preferred embodiment, lamp housing 14 is pivotally movable with respect to the battery casing 15, whereby when the bulb 16 is illuminated, the battery casing 15 may be suitably positioned, for example on a surface 12, and the light beam may be selectively directed to illuminate a given area. This permits desired functional use of the spotlight assembly 23 in a hands-free mode. However, it should also be appreciated that lamp housing 14 may preferably include a support member 72 for suspending the spotlight assembly as desired (e.g., from a tree branch or inside a tent) and then selectively illuminating an area--thereby leaving both hands free for a particular activity.

It should be emphasized that there are many instances where spotlight assembly 23 would be particularly useful in view of the structural features allowing the light beam to be selectively adjustable and the spotlight to be effectively operational in a self-supporting mode. For example, a police officer may effectively use spotlight system 10 during a nighttime traffic stop. That is, the spotlight assembly 23 could be adjusted and positioned to illuminate certain areas of a trunk or passenger compartment while the officer carried out a desired activity or search—with both hands available. Fire fighters could also use spotlight assembly 23 at night when trying to locate an object or person in a dark, smoke-filled building or when trying to rescue (or resuscitate) a victim—where both hands are needed. In addition, with the self-supporting, specially multi-directional spotlight configuration—and multiple power features—spotlight system 10 could also be especially advantageous in a variety of other situations such as, for example (as noted before), changing a car tire at night on a busy highway or narrow road—when lighting availability is especially critical.

In addition, a power cord 33 is preferably provided and configured so as to be releaseably connectable preferably between automotive 12 volt DC power (e.g., DC power 39 as shown in FIG. 3) and the lamp housing 14 whereby the automotive DC power is electrically available for connection to the bulb 16 through switch 18. With such a construction, bulb 16 is selectively operable with either at least one rechargeable battery 19 or automotive DC power.

The foregoing disclosure and description of the invention is illustrative and explanatory of presently preferred embodiments of the invention and variations thereof, and it will be appreciated by those skilled in the art, that various changes in the design, organization, order of operation, means of operation, equipment structures and location, methodology, the use of mechanical equivalents, such as different types of batteries than as illustrated whereby different steps may be utilized, as well as in the details of the illustrated construction or combinations of features of the various elements may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be varied from that shown and the invention still operate well within the spirit of the invention as described hereinbefore and in the appended claims. Thus, various changes and alternatives may be used that are contained within the spirit of the invention.

Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A spotlight system for use with an automobile so as to provide lighting where needed, said spotlight system comprising:
   a lamp housing, said lamp housing comprising at least one bulb, a switch, and an enclosure, said enclosure being configured for releaseably mounting said at least one bulb therein, and said enclosure having at least a front comprising a lens configured for a desired dissemination of a light beam from said bulb passing therethrough;
   a battery recharger connectable to AC power;
   a rechargeable battery, said rechargeable battery being removeable from said lamp housing and insertable in said battery charger for charging with said AC power;
   electrical contacts configured to be matable with said lamp housing to provide an electrical connection to said bulb through a switch from said battery;
   a power cord removeably connectable between an automobile DC power and said lamp housing such that when said cord is connected to said automobile DC power then said automobile DC power is electrically available for connection to said bulb and is operable without said rechargeable battery whereby said lamp housing without said rechargeable battery weighs less for hand held usage, and when said rechargeable battery is inserted in said lamp housing then said rechargeable battery is connected to said automobile DC voltage for charging, said bulb being operable with either said rechargeable battery or said automobile DC power.

2. The spotlight system of claim 1, wherein said lens produces a beam having a diameter of 3½ inches to 5 inches, and a battery casing for said rechargeable battery, said battery casing defining a support surface with a size and shape adapted for supporting said spotlight, said rechargeable battery having a weight with a center of gravity substantially adjacent said support surface such that when said rechargeable battery is inserted in said lamp housing then said weight of said rechargeable battery and said support surface of said battery casing provide an anchoring effect to help prevent toppling of said lamp housing when in a desired position, said battery casing having a width corresponding to said beam width and being sized smaller than said beam.

3. The spotlight system of claim 1, wherein said rechargeable battery is removeable from said battery casing.

4. The spotlight system of claim 1, further comprising:
   a plurality of rechargeable batteries, said recharger defining a plurality of slots for simultaneously receiving said plurality of rechargeable batteries.

5. The spotlight system of claim 1, further comprising:
   a rectifier and voltage regulator in said lamp housing, whereby said rechargeable battery may be charged by selectively connecting said lamp housing to AC power or said automobile DC voltage for charging.

6. The spotlight system of claim 1, wherein said lamp housing is movable with respect to said battery casing, whereby said battery casing may be suitably positioned and said light beam may be selectively directed to illuminate a given area.

7. The spotlight system of claim 1, wherein battery charger selectively operates from said AC power or said automobile DC power.

8. The spotlight system of claim 1, further comprising an elongated handle which is foldable such that said battery casing connectable thereto may be positioned adjacent said lamp housing.

9. The spotlight system of claim 8, further comprising:
a trigger switch operable intermittently in a spring-loaded position or with a latch to keep the light on without the need to hold the trigger in.

10. The spotlight system of claim 1, further comprising:
a relative bulb positioning adjustment member for selectively changing the position of said bulb with respect to said enclosure so as to adjust the light emanating from said bulb and passing through said lens.

11. The spotlight system of claim 1, wherein said at least one bulb is a driving light bulb suitable for being removeably mounted in a given vehicle driving headlight so as to foster interchangeability in the event either said driving light bulb in said lamp housing or said vehicle driving headlight bulb burns out.

12. A spotlight system comprising:
a lamp housing comprising at least one bulb and an enclosure, said enclosure comprising a back and a front and a peripheral structure therebetween defining an interior, said enclosure being configured for releaseably mounting said at least one bulb therein, said enclosure further comprising a reflective member adapted to reflect a given light beam, said reflective member being mountable within said enclosure interior, and at least a portion of said front comprising a lens configured for a desired dissemination of a given light beam passing therethrough said lens having a beam diameter of about 3½ inches to 5 inches;
a battery supply;
a battery casing for said battery supply, said battery casing comprising electrical contacts formed thereon and being configured for detachably mounting said lamp housing, said battery casing comprising a bottom with at least a portion of said bottom having a generally planar exterior surface, a top face, and a periphery formed therebetween, and said battery supply having a given weight, whereby the combination of said battery casing having a selected configuration with said battery supply forming a ballast-like structure having an anchoring effect to help prevent toppling of said lamp housing and battery casing with said rechargeable batteries contained therein when in a desired position, said battery casing having a front bottom surface with a width less than said beam diameter; and
an electrical switch for electrical connection to said bulb from said battery supply through said electrical contacts when said lamp housing is detachably mounted to said battery casing, said electrical switch configured for selectively connecting power from said battery supply to said bulb so as to illuminate said bulb in a connected illuminating mode, said electrical switch being configured for selectively disconnecting said battery supply from said bulb so as to extinguish said bulb in a disconnected mode.

13. The spotlight system of claim 12, wherein said battery supply comprises a first rechargeable battery, and further comprising a battery recharger connectable to AC power or DC power, said recharger defining a plurality of slots for receiving a plurality of rechargeable batteries, said rechargeable battery being removeable from said lamp housing and insertable in said battery charger for charging with said AC power or said DC power and being replaced by a second rechargeable battery.

14. The spotlight system of claim 13, further comprising:
a vehicle DC power adapter being removeably connectable between a vehicle cigarette lighter electrical socket and said lamp housing having a connectable configuration such that when vehicle DC power is connected to said lamp housing, said switch is configured for selectively connecting DC power to said bulb without said rechargeable battery, whereby said lamp housing without said rechargeable battery weighs less for hand held usage, and when said lamp housing is connected to said rechargeable battery, then said rechargeable battery is connected to said vehicle DC voltage for charging, said bulb being operable with either said rechargeable battery or said vehicle DC power.

15. The spotlight system of claim 14, further comprising:
an AC power adapter being removeably connectable between a AC power and said lamp housing having a connectable configuration, said lamp housing further comprising a selected circuit configuration such that when said AC power is connected to said lamp housing, said switch is configured for selectively connecting AC power to said bulb without said rechargeable battery, whereby said lamp housing without said rechargeable battery weighs less for hand held usage, said bulb being operable with either said rechargeable battery or said AC power.

16. The spotlight system of claim 12, wherein said lamp housing is pivotally movable with respect to said battery casing, whereby said battery casing may be suitably positioned and said light beam may be selectively directed to illuminate a given area.

17. The spotlight system of claim 12 wherein at least a portion of said lamp housing is formed from a metallic material.

18. The spotlight system of claim 12, wherein said front bottom surface has a width which is in the range of 70% to 98% of said beam diameter.

19. A method for making a spotlight system, said method comprising:
providing a lamp housing having at least one bulb releaseably mounted therein;
providing a rechargeable battery removeably insertable into said lamp housing;
providing an electrical switch for electrical connection to said bulb through said switch from said at least one rechargeable battery;
providing a power cord releaseably connectable between automotive DC power and said lamp housing whereby said automotive DC power is electrically available for connection to said bulb through said switch;
providing that said bulb is selectively operable with either said rechargeable battery or said automotive DC power.

20. The method of claim 19, further comprising:
providing a rectifier and voltage regulator in said lamp housing so that said least one rechargeable battery may be selectively charged using said AC power or said automobile DC voltage;
providing a selected circuit configuration and an AC power adapter, said AC power adapter being releaseably connectable to AC power such that said spotlight system bulb is operable using AC power; and
providing a battery charger operable for simultaneously charging a plurality of rechargeable batteries.

* * * * *